(12) United States Patent
Hirata et al.

(10) Patent No.: US 10,386,863 B2
(45) Date of Patent: Aug. 20, 2019

(54) PRESSURE-TYPE FLOW CONTROLLER

(71) Applicant: FUJIKIN INCORPORATED, Osaka (JP)

(72) Inventors: Kaoru Hirata, Osaka (JP); Nobukazu Ikeda, Osaka (JP); Kouji Nishino, Osaka (JP); Ryousuke Dohi, Osaka (JP); Katsuyuki Sugita, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 27 days.

(21) Appl. No.: 15/027,828

(22) PCT Filed: Oct. 15, 2014

(86) PCT No.: PCT/JP2014/005233
§ 371 (c)(1),
(2) Date: Apr. 7, 2016

(87) PCT Pub. No.: WO2015/064035
PCT Pub. Date: May 7, 2015

(65) Prior Publication Data
US 2016/0252913 A1    Sep. 1, 2016

(30) Foreign Application Priority Data
Oct. 31, 2013  (JP) .................. 2013-227102

(51) Int. Cl.
*G05D 7/06* (2006.01)
*F16K 7/14* (2006.01)
*F16K 31/00* (2006.01)

(52) U.S. Cl.
CPC ............. *G05D 7/0635* (2013.01); *F16K 7/14* (2013.01); *F16K 31/004* (2013.01); *G05D 7/0641* (2013.01); *Y10T 137/2544* (2015.04)

(58) Field of Classification Search
CPC ....... Y10T 137/2544; Y10T 137/87169; Y10T 137/87217; G05D 7/0635
See application file for complete search history.

(56) References Cited

U.S. PATENT DOCUMENTS 4,253,480 A * 3/1981 Kessel .................. G05B 11/28
137/102
4,580,598 A * 4/1986 Itoh ..................... F16K 31/0606
137/596.17

(Continued)

FOREIGN PATENT DOCUMENTS

CA    2 423 342 A1   6/2003
JP    H08-338546 A   12/1996

(Continued)

OTHER PUBLICATIONS

International Search Report; PCT/JP2014/005233 dated Jan. 20, 2015.

*Primary Examiner* — Kevin F Murphy
(74) *Attorney, Agent, or Firm* — Studebaker & Brackett PC

(57) ABSTRACT

A pressure-type flow controller includes a main body provided with a fluid channel between a fluid inlet and a fluid outlet and an exhaust channel between the fluid channel and an exhaust outlet; a pressure control valve fixed to the fluid inlet of the main body for opening/closing the upstream side of the fluid channel; a pressure sensor for detecting the internal pressure of the fluid channel on the downstream side of the pressure control valve; an orifice provided in the fluid channel on the downstream side of the point of branching of the exhaust channel; and an exhaust control valve for opening/closing the exhaust channel.

13 Claims, 14 Drawing Sheets

(56) References Cited

U.S. PATENT DOCUMENTS

| | | | |
|---|---|---|---|
| 5,669,408 A | | 9/1997 | Nishino et al. |
| 5,791,369 A | | 8/1998 | Nishino et al. |
| 5,816,285 A | | 10/1998 | Ohmi et al. |
| 5,865,205 A | | 2/1999 | Wilmer |
| 5,950,668 A | * | 9/1999 | Baumann ............... F15B 9/09 137/486 |
| 6,637,724 B1 | * | 10/2003 | Mayer ................... B60T 8/363 251/129.01 |
| 7,152,629 B2 | * | 12/2006 | Tokuda ................ F16K 27/003 137/884 |
| 7,505,818 B1 | * | 3/2009 | Kohler .................. G05B 11/28 137/102 |
| 8,156,953 B2 | * | 4/2012 | Tveita ................ G05D 16/2033 137/102 |
| 8,485,219 B2 | | 7/2013 | Goto et al. |
| 2002/0069916 A1 | * | 6/2002 | Ferguson ............. F04B 49/065 137/487.5 |
| 2004/0204794 A1 | | 10/2004 | Ohmi et al. |
| 2010/0101656 A1 | * | 4/2010 | Zheng ................. B61D 27/0009 137/14 |
| 2011/0108138 A1 | * | 5/2011 | Sugita ................. G05D 7/0635 137/488 |

FOREIGN PATENT DOCUMENTS

| | | |
|---|---|---|
| JP | H10-55218 A | 2/1998 |
| JP | H11-045122 A | 2/1999 |
| JP | 2003-195948 A | 7/2003 |
| JP | 2006-330851 A | 12/2006 |
| JP | 2008-039513 A | 2/2008 |
| JP | 2010-512916 A | 4/2010 |

* cited by examiner

- PRIOR ART -

- PRIOR ART -

- PRIOR ART -

- PRIOR ART -

- PRIOR ART -

PRESSURE-TYPE FLOW CONTROLLER

TECHNICAL FIELD

The present invention relates to the improvement of a pressure-type flow controller. It relates to a pressure-type flow controller with the responsiveness enhanced, thereby significantly enhancing the operation performance of a source gas supply device for a semiconductor manufacturing device, etc.

BACKGROUND ART

Conventionally, in source gas supply devices for semiconductor manufacturing devices, etc., heat-type flow controllers and pressure-type flow controllers have been widely used for controlling the flow of the supply gas. In particular, the latter pressure-type flow controller FCS is, as shown in FIG. 6, composed of a control valve CV, a temperature detector T, a pressure detector P, an orifice OL, a computation control unit CD including a temperature correction/flow computation circuit CDa, a comparison circuit CDb, an input/output circuit CDc, an output circuit CDd, etc., and the like. Such a controller has excellent flow characteristics in that stable flow control can be performed even when the primary-side supply pressure is significantly changed.

That is, in the pressure-type flow controller FCS of FIG. 6, values detected at the pressure detector P and the temperature detector T are input to the temperature correction/flow computation circuit CDa, where the detected pressure is subjected to temperature correction and flow computation, and then the flow computation value Qt is input to the comparison circuit CDb. In addition, an input signal Qs corresponding to the set flow is input from the terminal In and then input to the comparison circuit CDb through the input/output circuit CDc, where the signal is compared with the flow computation value Qt from the temperature correction/flow computation circuit CDa described above. As a result of this comparison, in the case where the set flow input signal Qs is smaller than the flow computation value Qt, a control signal Pd is output to the actuator of the control valve CV. Accordingly, the control valve CV is actuated in the closing direction, and actuated toward the valve-closing direction until the difference between the set flow input signal Qs and the computed flow value Qt (Qs−Qt) reaches zero.

In the pressure-type flow controller FCS, when a so-called critical expansion condition of $P_1/P_2 \geq$ about 2 is maintained between the pressure $P_2$ on the downstream side and the pressure $P_1$ on the upstream side of the orifice OL, the gas flow Q through the orifice OL is as follows: $Q=KP_1$ (wherein K is a constant). Meanwhile, when the critical expansion condition is not satisfied, the gas flow Q through the orifice OL is as follows: $Q=KP_2^m(P_1-P_2)^n$ (wherein K, m, and n are constants).

Therefore, excellent characteristics can be exerted as follows. That is, the flow Q can be controlled with high precision by controlling the pressure $P_1$. Further, even when there is a significant change in the pressure of the gas Go on the upstream side of the control valve CV, the controlled flow value hardly changes.

The pressure-type flow controller designed such that the gas flow Q is computed as $Q=KP_1$ (wherein K is a constant) as described above is generally called FCS-N type. In addition, the pressure-type flow controller designed such that the gas flow Q is computed as $Q=KP_2^m(P_1-P_2)^n$ (wherein K, m, and n are constants) is generally called FCS-WR type.

Further, as pressure-type flow controllers of this kind, other types called FCS-SN type and FCS-SWR type exist. FCS-SN type uses, as an orifice of the above FCS-N type, an orifice mechanism including a plurality of orifices OL connected in parallel so that gas is allowed to flow through at least one orifice by a switching valve, such as an orifice mechanism including two orifices connected in parallel and a switching valve provided on the inlet side of one orifice so that the flow control range can be changed by opening or closing the switching valve. FCS-SWR type uses the same orifice mechanism as an orifice of the above FCS-WR type.

Incidentally, with respect to the pressure-type flow controllers of FCS-N type, FCS-SN type, FCS-WR type, and FCS-SWR type described above, their own configurations, operation principles, and the like are already known, and thus the detailed description thereof will be omitted herein (JP-A-8-338546, JP-A-2003-195948, etc.).

In addition, as pressure-type flow controllers FCS, as shown in FIG. 7, the following types exist: a pressure-type flow controller FCS configured as shown in (a) for a gas fluid under critical conditions (hereinafter referred to as FCS-N type; JP-A-8-338546, etc.); (b) FCS-WR type for both a gas fluid under critical conditions and a gas fluid under non-critical conditions (JP-A-2003-195948, etc.); (c) flow-switch FCS-S type for a gas fluid under critical conditions (JP-A-2006-330851, etc.); and (d) flow-switch FCS-SWR type for both a gas fluid under critical conditions and a gas fluid under non-critical conditions (Japanese Patent Application No. 2010-512916, etc.).

Incidentally, In FIG. 7, $P_1$ and $P_2$ denote pressure sensors, CV denotes a control valve, OL denotes an orifice, $OL_1$ denotes a small-diameter orifice, $OL_2$ denotes a large-diameter orifice, and ORV denotes an orifice switching valve.

However, in pressure-type flow controllers of this kind, because orifices OL having a fine bore diameter are used, the gas replaceability is low. Thus, in the case where the control valve CV of a pressure-type flow controller FCS is closed to open the output side, it takes a long period of time to exhaust gas in the space part between the control valve CV and the orifice OL, leading to a problem in that the so-called gas step-down responsiveness is extremely low.

FIG. 8 shows an example of the step-down response characteristics of a conventional pressure-type flow controller of FCS-N type at the time of continuous steps. In the present circumstances, under the condition where an air-operated valve (not illustrated) on the downstream side of the orifice OL is opened, and a constant flow of gas is being supplied through the pressure-type flow controller, when the amount of gas supply is stepped down in steps, as compared with the case of a pressure-type flow controller for high flows (polygonal line A), in the case of a pressure-type flow controller for low flows (polygonal line B), it takes a time period of 1.5 seconds or more to complete step-down to a predetermined flow.

More specifically, in the case of FCS-N type and FCS-WR type, when the pressure on the downstream side of the orifice $OL_1$ is 100 Torr, and the flow is to be stepped down from 100% to 1% and from 100% to 4%, each step-down takes a time period of about 1 second or more. However, from the semiconductor manufacturing device (e.g., etcher) side, it is required that the flow be stepped down from 100% to 1% within a time period of 1 second or less.

In addition, in the case of FCS-S type and FCS-SWR type, when the pressure on the downstream side of the orifice $OL_1$ is 100 Torr, and the flow is to be stepped down from 100% to 10% and from 100% to 0.16%, each step-down takes a time period of about 1.2 seconds or more. However, from the semiconductor manufacturing device (e.g., etcher) side, it is required that the flow be stepped down from 100% to 10% within a time period of 1.2 seconds or less.

On the other hand, in order to enhance the step-down response characteristics of the above pressure-type flow controllers, it has been attempted to reduce the internal volume of the gas channel between the control valve CV and the orifice OL as much as possible.

FIG. 9 shows, as an example thereof, a pressure-type flow controller using a main body 2 with the internal volume minimized, configured such that the flow direction of the fluid of the control valve CV is reversed from an ordinary control valve CV, whereby gas flows in through the gap between the outer periphery of the diaphragm valve body 20 and the valve seat 2a, and flows out from the center of the valve seat 2a, thereby allowing for the reduction of the internal volume of the gas flow channel.

However, even in the pressure-type flow controller of FIG. 9, which uses a main body 2 with the internal volume minimized, it is difficult to significantly improve the step-down response characteristics by reducing the internal volume of the gas flow channel. Currently, as shown in FIG. 10, when the rated flow is as low as 10 SCCM, in the case of $N_2$ gas, step-down from 100% to 0% takes a time period of about 1 second, while in the case where the gas is $C_4F_8$ (flow factor=0.352260), such step-down takes a time period of about 3 seconds.

Incidentally, in FIGS. 10, C, D, and E show step-down characteristics at a flow of 10 SCCM, a flow of 20 SCCM, and a flow of 160 SCCM, respectively.

In addition, in a conventional pressure-type flow controller, for example, in the case where the control valve CV is closed to interrupt the flow control under the condition where the gas supply line connected to the orifice downstream side is temporarily closed by a switching valve or the like, the internal pressure of the fluid channel may increase due to the minute leakage of the source gas from the control valve CV. As a result, when the flow control is re-started, because of the increased internal pressure of the fluid channel, the responsiveness may decrease due to so-called overshooting in flow control at the time of step-up.

As described above, even in a pressure-type flow controller using a main body with the internal volume minimized, it has been difficult to sufficiently improve the step-down responsiveness characteristics of the pressure-type flow controller, and conventional pressure-type flow controllers still have problems of poor step-down response characteristics in the case where the rated flow is low, etc.

CITATION LIST

Patent Literature

Patent Literature 1: JP-A-8-338546
Patent Literature 2: JP-A-10-55218
Patent Literature 3: JP-A-2003-195948
Patent Literature 4: JP-A-2006-330851
Patent Literature 5: Japanese Patent Application No. 2010-512916

SUMMARY OF INVENTION

Technical Problem

The present invention is aimed at solving the problems of conventional pressure-type flow controllers as described above, that is, A. the step-down responsiveness in flow control is low; B. responsiveness improvement by minimizing the volume of a main body is limited, and the responsiveness cannot be sufficiently improved; C. depending on the kind of gas, such as $C_4F_8$, it is difficult to improve the step-down responsiveness only by minimizing the internal volume of a main body; etc. A main object of the invention is to provide a pressure-type flow controller configured such that at the time of the step-down of the controlled flow, the residual gas in a fluid channel space between a control valve CV and an orifice OL is forcibly exhausted, whereby the response characteristics of the pressure-type flow controller can be dramatically enhanced without causing changes to the flow control precision or the flow control range.

Solution to Problem

First, in order to examine the improvement of step-down characteristics caused by the forced exhaust of the residual gas in the fluid channel between a control valve CV and an orifice OL, the present inventors have measured various step-down characteristics using the device for measuring the response characteristics of a pressure-type flow controller by evacuation shown in FIG. 11.

Incidentally, in FIG. 11, RG denotes a pressure regulator, $P_0$ denotes a supply pressure sensor, CVa and CVb denote control valves, $P_1a$ and $P_1b$ denote pressure sensors, $UPC_1$ and $UPC_2$ denote pressure controllers, and $VL_2$ and $VL_3$ denote vacuum suction lines. The $UPC_1$ and the orifice OL compose a pressure-type flow controller (FCS-N type). In addition, the volume of the space part $VL_1$ between the pressure controller $UPC_1$ and the orifice OL is set at 6.0 CC.

That is, the flow of the supply gas is controlled by the pressure-type flow controller (FCS-N type) composed of the pressure controller $UPC_1$ and the orifice OL, while the exhaust function (control pressure step-down time) is regulated by the pressure regulator $UPC_2$. Then, a predetermined set pressure is simultaneously input to both of the pressure regulators $UPC_1$ and $UPC_2$, and the step response characteristics for the control pressure of each of the pressure controllers $UPC_1$ and $UPC_2$ were measured by the pressure sensors $P_1a$ and $P_1b$.

FIG. 12 shows the results of measuring the step-down characteristics by the response characteristics testing device of FIG. 11. FIG. 12(a) shows the case where the pressure control (flow control) is performed to reduce the flow from 100% flow sequentially to 80% flow, 60% flow, 40% flow, and 20% flow using only the control valve CVa of the pressure regulator $UPC_1$. Line $F_1$ is the voltage waveform of the control pressure input signal to the pressure regulator $UPC_1$, while Line $F_2$ is the voltage waveform of the control pressure output signal from the pressure regulator $UPC_1$.

As is clear from FIG. 12(a), the step-down of the voltage waveform of the control pressure output signal takes a time period of 1 second or more.

By contrast, FIG. 12(b) shows the case where the pressure regulator $UPC_2$ is operated at the same time to evacuate the internal space $VL_1$, turning it out that the step-down response time can be shortened to 0.5 seconds or less. Incidentally, the gas ($N_2$) supply pressure to the pressure regulator $UPC_1$ is 300 kPa abs, and the orifice OL is for a rated flow of 260 SCCM. In addition, the evacuation pressure is $10^{-5}$ Torr.

FIG. 13 shows the results of measuring the step-up characteristics by the response characteristics measuring device of FIG. 12. FIG. 13(a) shows the case where the pressure control (flow control) is performed to increase the flow from 0% flow sequentially to 20% flow, 40% flow, 60% flow, 80%, and 100% flow using only the control valve CVa of the pressure regulator $UPC_1$. Line $F_1$ is the voltage waveform of the control pressure input signal to the pressure regulator $UPC_1$, while Line $F_2$ is the voltage waveform of the control pressure output signal from the pressure regulator $UPC_1$.

By contrast, FIG. 13(b) shows the step-up response characteristics in the case where the pressure regulator $UPC_2$ is operated at the same time. As clear from comparison with FIG. 13(a), at the time of step-up response, there is no need to perform evacuation and thus the pressure regulator $UPC_2$ is not operated. Therefore, the response time at the time of step-up in FIG. 13(b) is approximately the same as in the case of FIG. 13(a), and it was confirmed that the step-up response time was 0.5 seconds or less. Incidentally, the gas ($N_2$) supply pressure to the pressure regulator $UPC_1$ is 300 kPa abs, and the orifice OL is for a rated flow of 260 SCCM. In addition, the evacuation pressure is $10^{-5}$ Torr.

FIG. 14 shows changes in the input voltage to the piezoelectric element (not illustrated) for the actuation of each control valve CVa/CVb at the time of measuring the step-down characteristics by the response characteristics measuring device of FIG. 11 described above. FIG. 14(a) shows the piezoelectric element actuation voltage in the case where the pressure control (flow control) is performed to reduce the flow from 100% flow sequentially to 80% flow and 60% flow using only the control valve CVa of the pressure regulator $UPC_1$. Incidentally, Line $F_1$ is the voltage waveform of the control pressure input signal to the pressure regulator $UPC_1$, while Line $F_2$ is the voltage waveform of the control pressure output signal from the pressure regulator $UPC_1$.

In addition, FIG. 14(b) shows the input voltage waveform $F_{10}$ to the piezoelectric-driven element of the control valve CVa for gas supply, while FIG. 14(c) shows the input voltage waveform $F_{20}$ to the piezoelectric driving element of the control valve CVb for exhaust.

Incidentally, the input voltage waveforms $F_{10}$ and $F_{20}$ to the respective piezoelectric-driven elements are each shown in ⅟₃₀ the actual size.

The pressure-type flow controller according to the present invention has been created based on the test results using the response characteristics testing device described above, and is characterized by including: a main body provided with a fluid channel communicating between a fluid inlet and a fluid outlet and an exhaust channel branched from the fluid channel and communicating between the fluid channel and an exhaust outlet; a control valve for pressure control fixed to the fluid inlet side of the main body for opening/closing the upstream side of the fluid channel; a pressure sensor for detecting the internal pressure of the fluid channel on the downstream side of the control valve for pressure control; an orifice provided in the fluid channel on the downstream side of the point of branching of the exhaust channel; and a control valve for exhaust control for opening/closing the exhaust channel.

The pressure-type flow controller may be an FCS-WR type pressure-type flow controller configured to further include a pressure sensor for detecting the internal pressure of the fluid channel on the orifice downstream side.

The pressure-type flow controller may also be an FCS-SN type pressure-type flow controller configured as such that a plurality of orifices are connected in parallel, and a fluid is allowed to flow through at least one orifice by a switching valve.

The pressure-type flow controller may also be an FCS-SWS type pressure-type flow controller configured such that a plurality of orifices are connected in parallel, and a fluid is allowed to flow through at least one orifice by a switching valve, and also including a pressure sensor for detecting the internal pressure of the fluid channel on the orifice downstream side.

The control valve for pressure control and the control valve for exhaust control may each be a metal-diaphragm-operated control valve actuated by a piezoelectric element.

The configuration may be such that the shutdown response time is controlled by adjusting the input voltage to a piezoelectric driving element of the control valve for exhaust control.

The control valve for exhaust control may be a pneumatically actuated valve or an electromagnetically actuated valve. In addition, the configuration may forcibly exhausted gas in the exhaust channel by a vacuum pump connected to the exhaust outlet.

Advantageous Effects of Invention

The pressure-type flow controller according to the present invention includes: a main body provided with a fluid channel and an exhaust channel; a control valve for pressure control fixed to the main body for opening/closing the upstream side of the fluid channel; a pressure sensor for detecting the internal pressure of the fluid channel on the downstream side of the control valve; an orifice provided in the fluid channel on the downstream side of the point of branching of the exhaust channel; and a control valve for exhaust control for opening/closing the exhaust channel. Accordingly, at the time of changing the fluid flow by the pressure-type flow controller, when the control valve for pressure control and the control valve for exhaust control are operated to forcibly exhaust gas in the fluid channel space between the control valve for pressure control and the orifice, the control response upon a change in the controlled flow is enhanced, whereby the step-down time in flow control can be significantly shortened, and also the regulation of step-down time is facilitated. In addition, it becomes possible to improve the so-called gas replaceability of the pressure-type flow controller, leading to improvement in the capacity utilization, improvement in the quality of semiconductor products, and the like.

In addition, it also becomes possible to arbitrarily select the width dimension of the main body of the pressure-type flow controller. For example, the dimension can be adjusted to the width dimension of a conventional pressure-type flow controller, that is, 92 mm. As a result, the pressure-type flow controller can also be easily applied to the repair of conventional facilities.

Further, when the evacuation line is made blind (removed and blocked), such a controller can also be applied as an ordinary pressure-type flow controller.

DESCRIPTION OF EMBODIMENTS

Hereinafter, embodiments of the present invention will be described with reference to the drawings.

Figure 1:
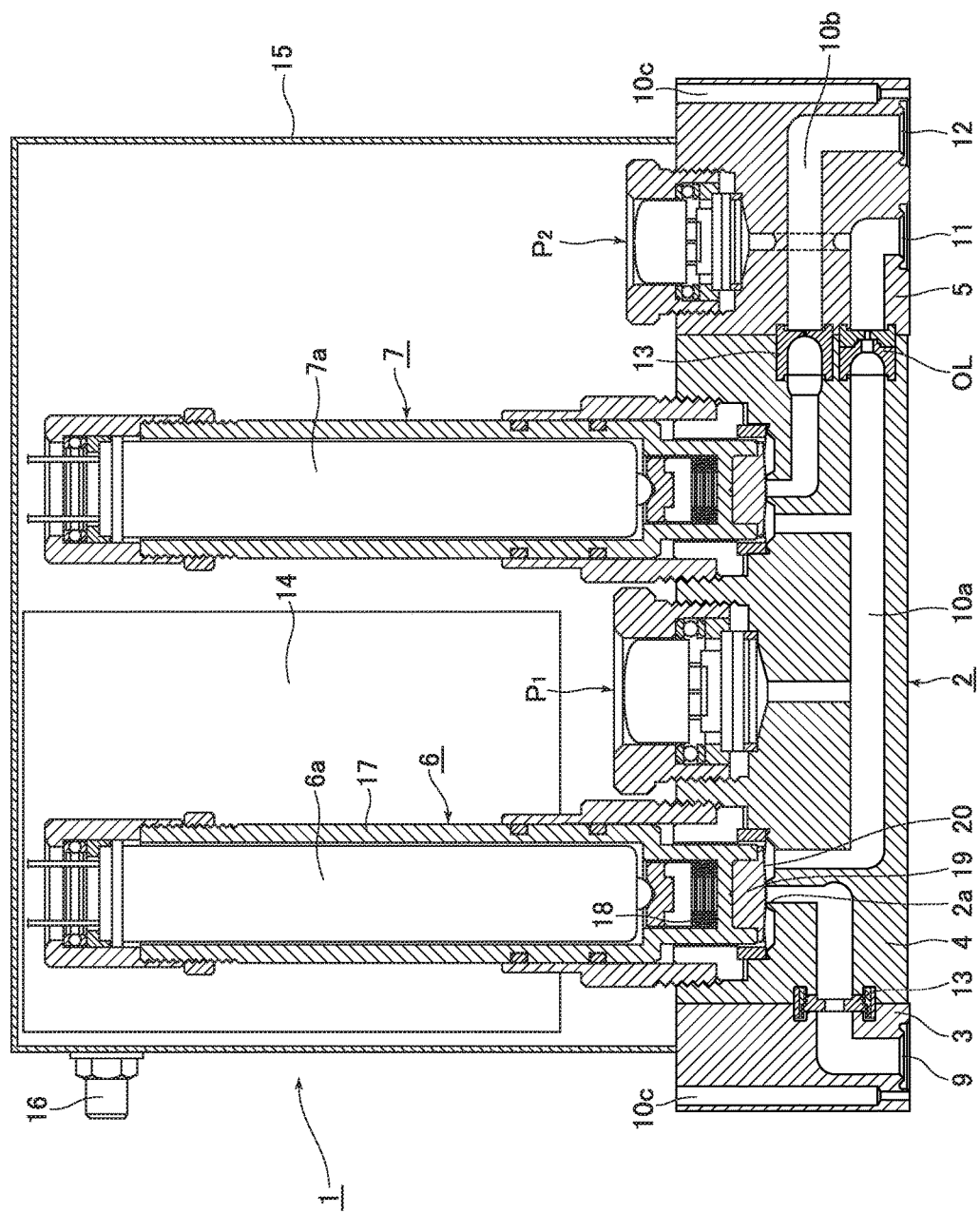
FIG. 1 A longitudinal cross-sectional view showing the basic configuration of the pressure-type flow controller according to the present invention.
Figure 2:
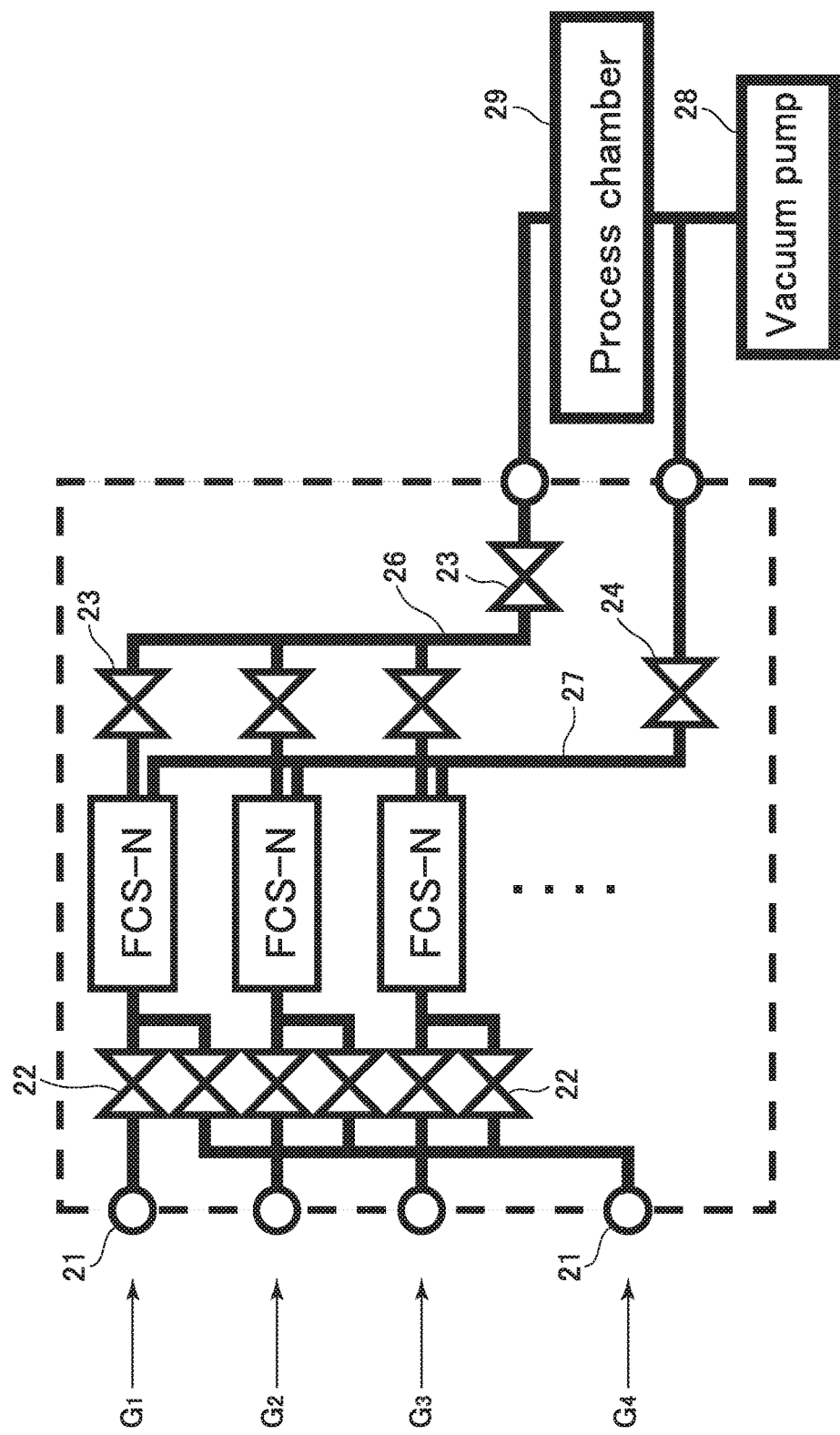
FIG. 2 A system diagram showing the configuration of a gas supply box to which the pressure-type flow controller according to the present invention is applied.

FIG. 1 is a longitudinal cross-sectional view showing the basic configuration of the pressure-type flow controller of the present invention, and FIG. 2 is a system diagram showing the configuration of a gas supply box provided with the pressure-type flow controller according to the present invention.

The pressure-type flow controller 1 is composed of a main body 2, a control valve for pressure control 6, a control valve for exhaust control 7, pressure sensors $P_1$ and $P_2$, an orifice OL, and the like. The embodiment of FIG. 2 is a pressure-type flow controller of FCS-WR type using one orifice OL.

Incidentally, in FIG. 1, reference sign 2a denotes a valve seat, reference sign 3 denotes an inlet-side block, reference sign 4 denotes a main body block, reference sign 5 denotes an outlet-side block, reference sign 9 denotes a fluid inlet, reference sign 10a denotes a fluid channel, reference sign 10b denotes an exhaust channel, reference sign 10c denotes a channel for leak detection, reference sign 11 denotes a fluid outlet, reference sign 12 denotes an exhaust outlet, reference sign 13 denotes a gasket, reference sign 14 denotes a panel control board for control, reference sign 15 denotes a casing, and reference sign 16 denotes a connector for connection.

The main body 2 comprises the inlet-side block 3, the main body block 4, and the outlet-side block 5 assembled together and integrated by a securing bolt (not illustrated). The control valve for pressure control 6, the control valve for exhaust control 7, the pressure sensors $P_1$ and $P_2$, and the like are each screw-fixed to the valve body 2. In addition, the pressure sensor $P_2$ is communicated to the fluid channel 10a avoiding intersection with the exhaust channel 10b.

The control valve for pressure control 6 is an on/off valve using a piezoelectric-driven element 6a, in which a known metal diaphragm serves as a valve body 20. When energized, the piezoelectric-driven element 6a expands to push a cylindrical body 17 upward against the elasticity of an elastic body 18. As a result, by the elastic force of the metal diaphragm valve body 20, the valve body presser 19 is moved upward, whereby the valve body 20 comes off the valve seat 2a, and the valve is opened. In addition, the degree of valve opening is adjusted by changing the voltage applied to the piezoelectric-driven element 6a.

Incidentally, the operation of the control valve for exhaust control 7 is the same as the operation of the control valve for pressure control 6, and the degree of valve opening is controlled by adjusting the elongation amount of a piezoelectric-driven element 7a.

In addition, as the control valve for exhaust control 7, in place of the piezoelectrically actuated metal-diaphragm-operated on/off valve, it is also possible to use a known pneumatically actuated or electromagnetically actuated on/off valve.

FIG. 2 is a system diagram showing the configuration of a gas supply box to which the pressure-type flow controller according to the present invention is applied. Three kinds of live gas $G_1$ to $G_3$ and $N_2$ gas are supplied to a process chamber 29, each independently, or as a mixture of suitable kinds of gas by a predetermined ratio. Incidentally, as described above, through the control valve for exhaust control 7 (not illustrated), gas in the internal space of FCS-N is forcibly exhausted (evacuated) by a vacuum pump 28 through an outlet-side on/off valve 24 of an exhaust line 27.

Incidentally, in FIG. 2, reference sign 21 denotes a gas supply port, reference sign 22 denotes a supply-side switching valve, reference sign 23 denotes an outlet-side switching valve, and reference sign 26 denotes a mixed gas supply line.

With reference to FIG. 1, in ordinary continuous flow control, the gas flowing in from the fluid inlet 9 is pressure-controlled by the control valve for pressure control 6, and then, through the orifice OL, supplied from the fluid outlet 11 to a predetermined point. In addition, when the controlled flow is to be reduced, for example, stepped down from 100% flow to 50% flow, a switching control signal to 50% flow and a valve opening signal are input from the control board 14 to the control valve for pressure control 6 and the control valve for exhaust control 7, respectively, whereby the control valve for exhaust control 7 is opened. As a result, through the control valve for exhaust control 7, gas between the control valve for pressure control 6 and the orifice OL is forcibly exhausted, and the step-down response time is shortened.

Incidentally, needless to say, by regulating the degree of valve opening of the control valve for exhaust control 7, the step-down time can be controlled.

Figure 3:
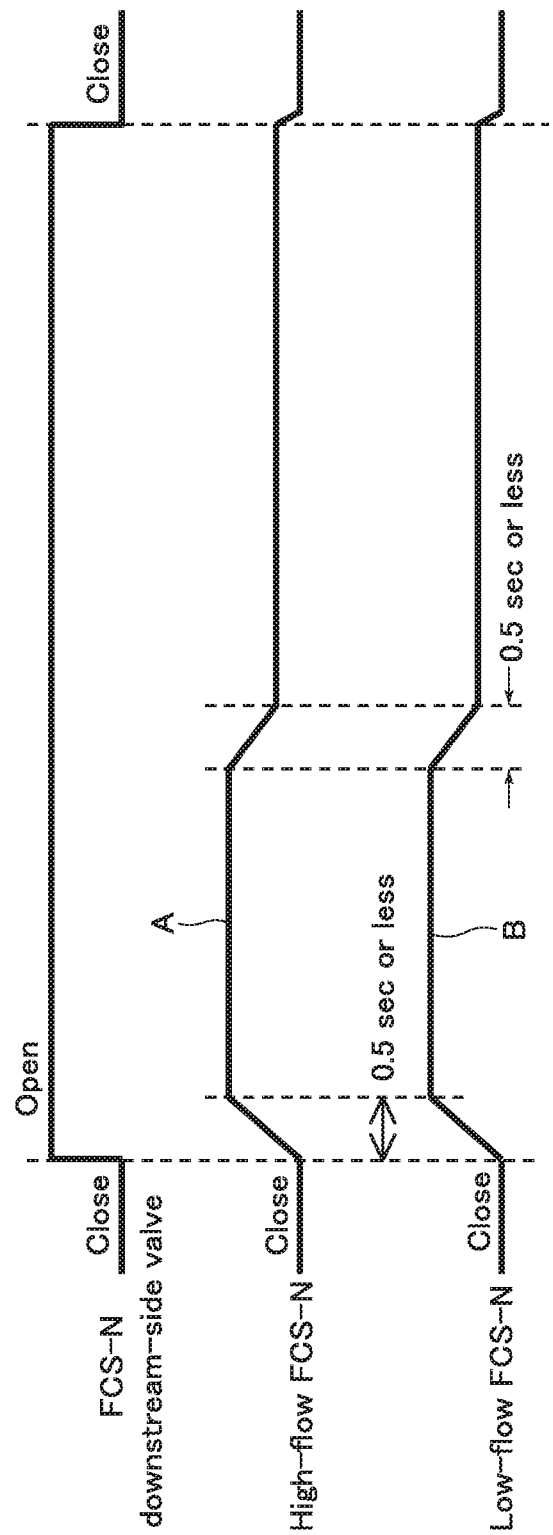
FIG. 3 A line graph showing the step-down response characteristics of the pressure-type flow controller according to the embodiment at the time of continuous steps.
Figure 8:
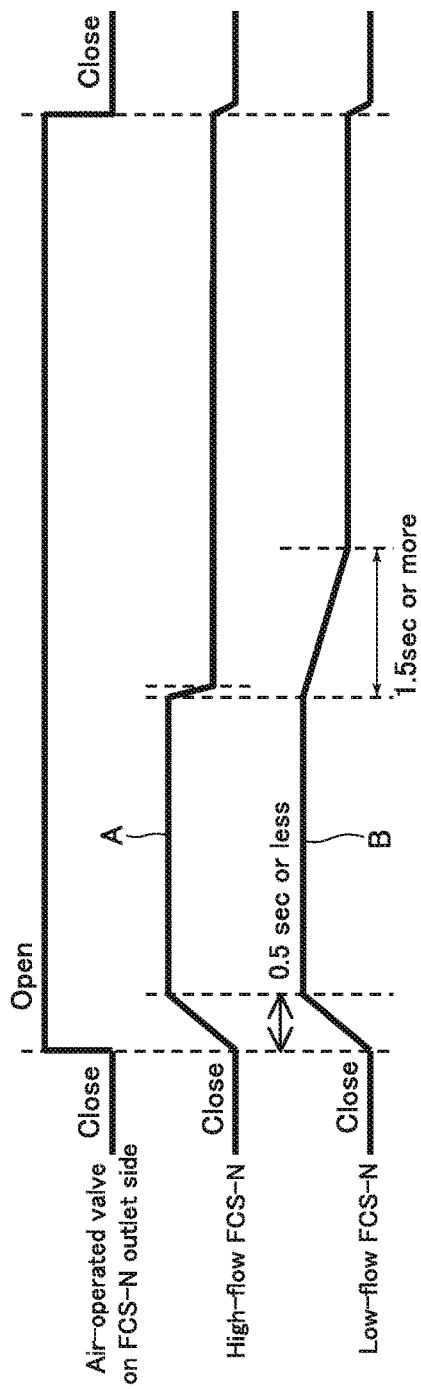
FIG. 8 A line graph showing an example of the step-down response characteristics of a conventional pressure-type flow controller (FCS-N type) at the time of continuous steps.
Figure 9:
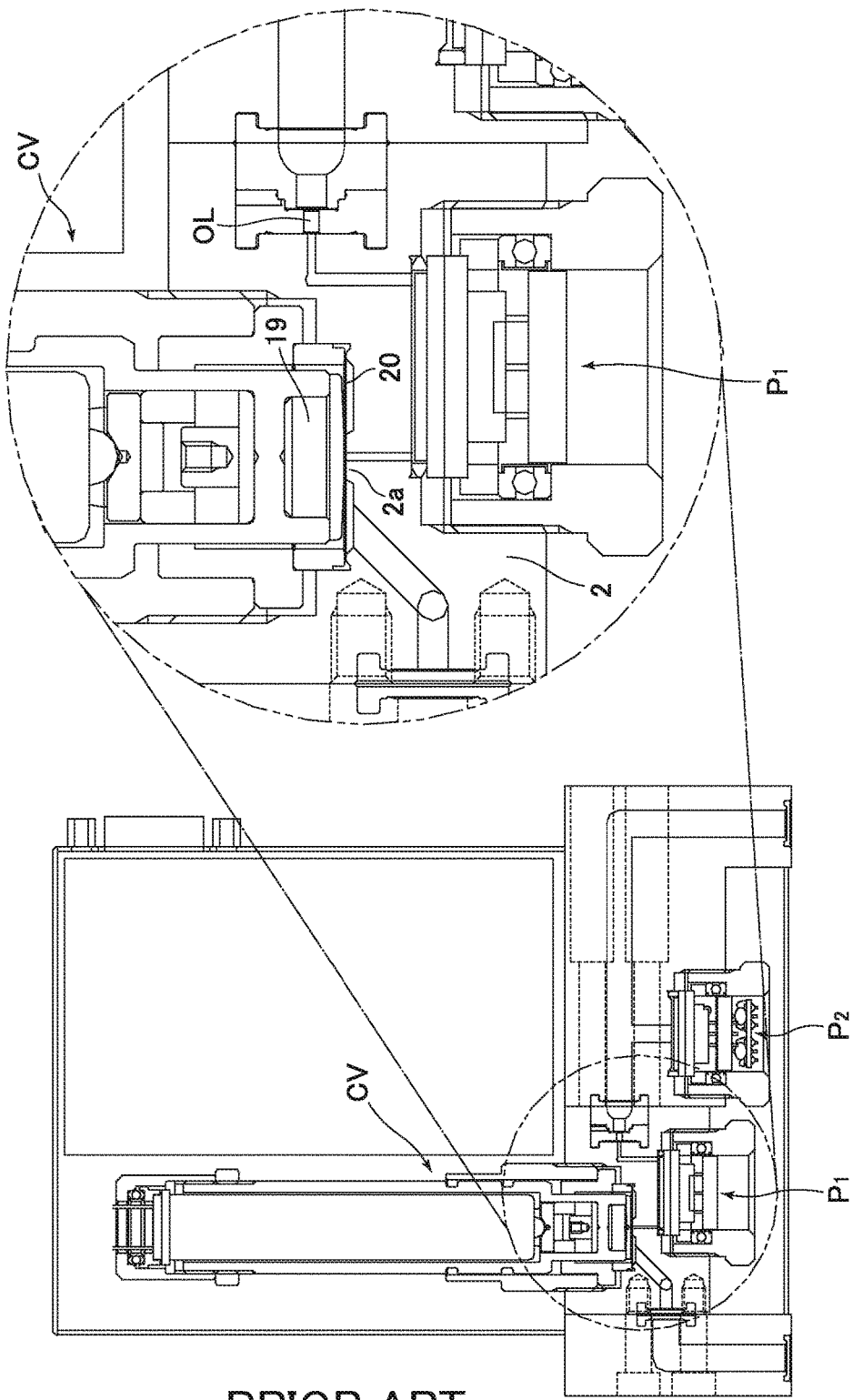
FIG. 9 A schematic diagram of a valve mechanism part of a pressure-type flow controller (FCS-N type, FCS-WR type) using a main body with minimized internal volume.
Figure 10:
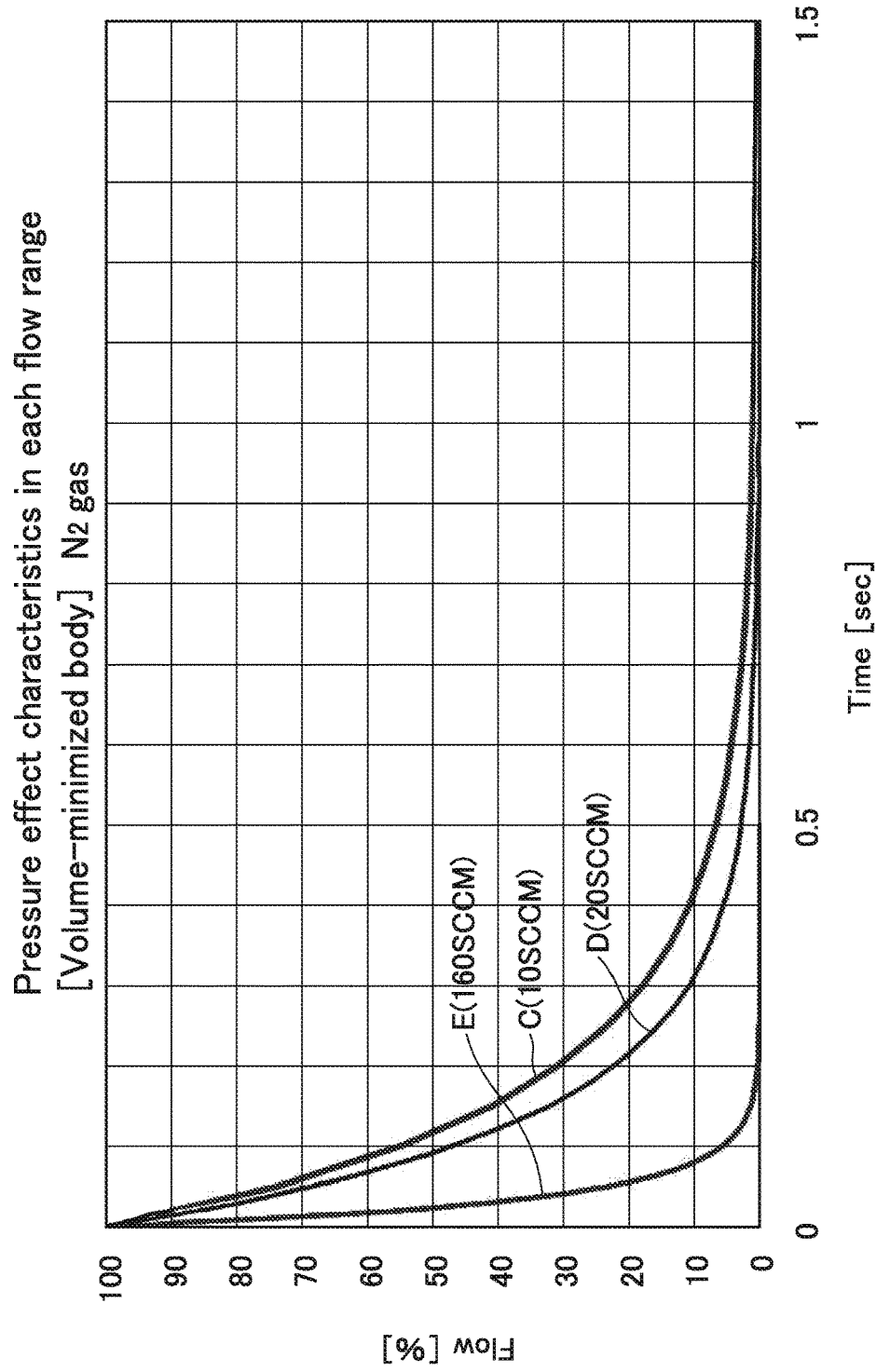
FIG. 10 A line graph showing a flow step-down characteristic curve (from 100% to 0%) of the pressure-type flow controller of FIG. 9 (FCS-N type).
Figure 11:
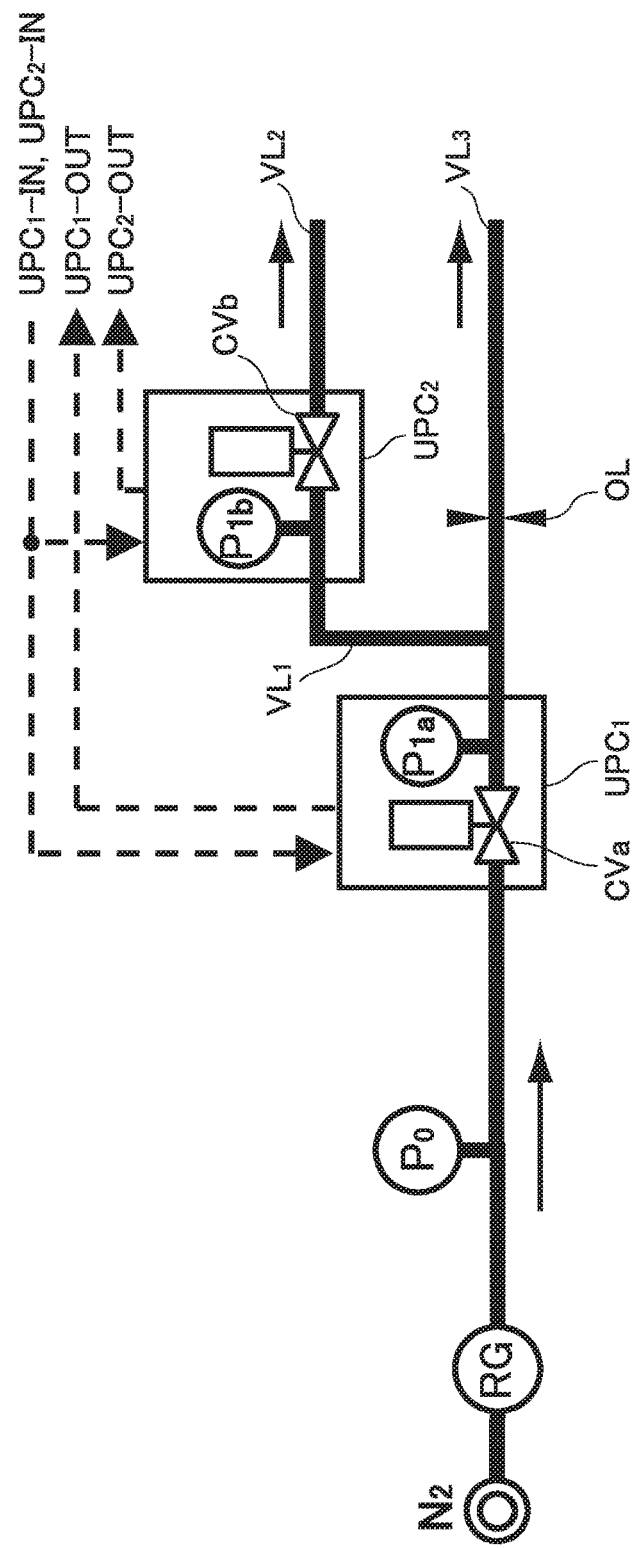
FIG. 11 A systematic configuration diagram of a device for measuring the response characteristics of a pressure-type flow controller provided with an evacuation line.
Figure 12:
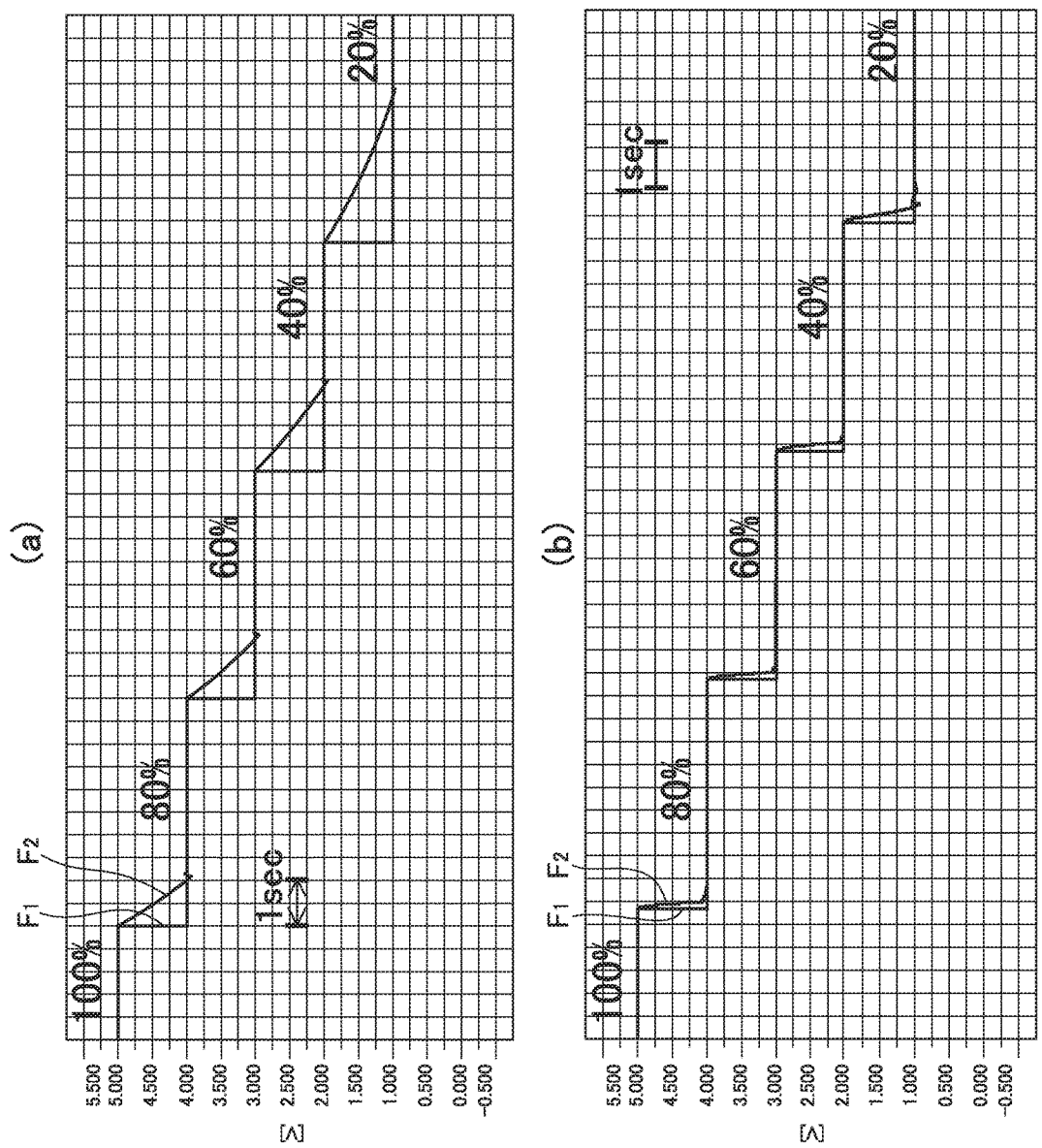
FIG. 12 Line graphs each showing the results of measuring step-down response characteristics by the response characteristics measuring device of FIG. 11: (a) shows the case where step-down is performed by only the control valve on the supply side, while (b) shows the case where step-down is performed by both control valves on the supply side and the evacuation side.
Figure 13:
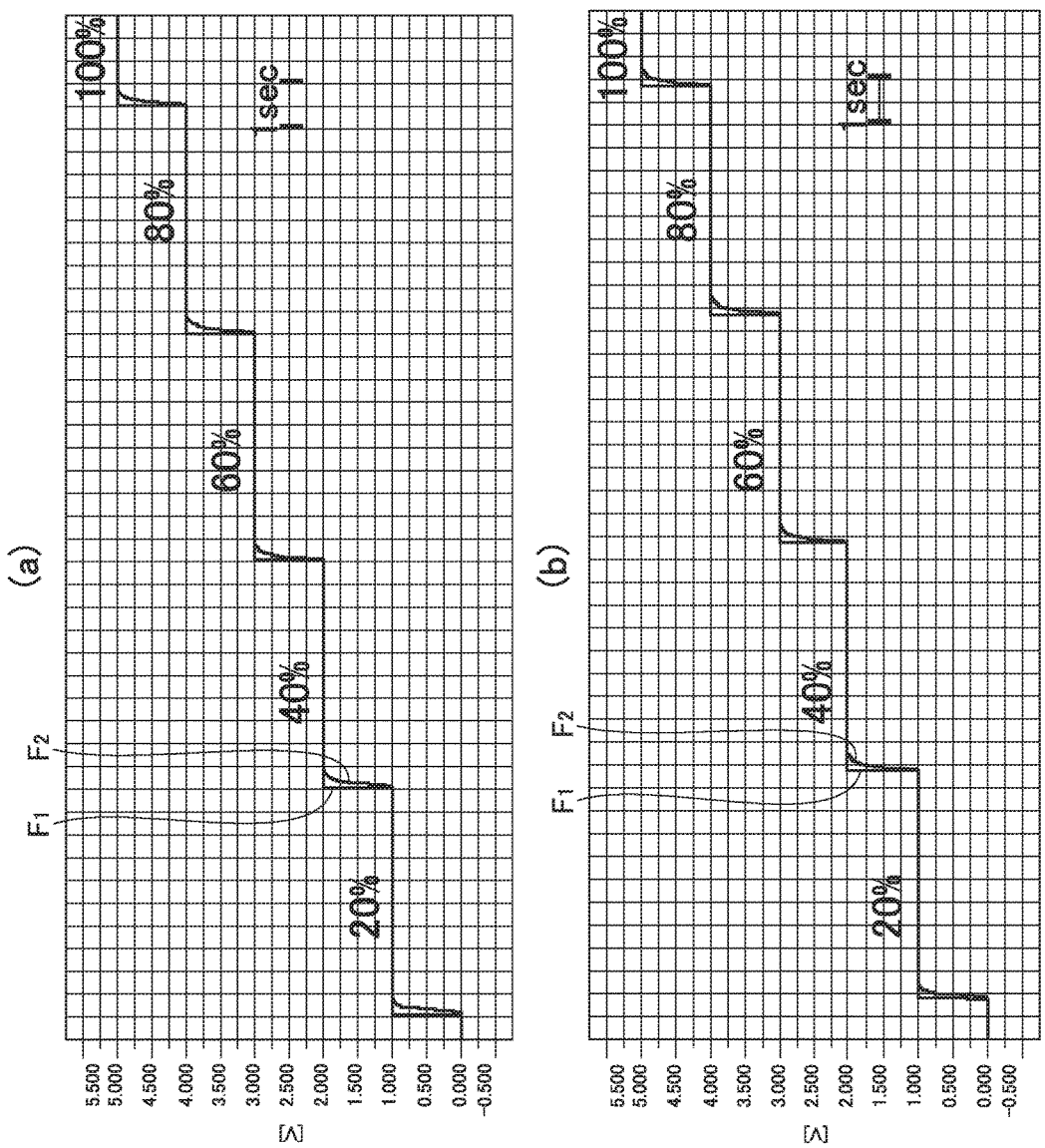
FIG. 13 Line graphs each showing the results of measuring step-up response characteristics by the response characteristics measuring device of FIG. 11: (a) shows the case where step-up is performed by only the control valve on the supply side, and (b) shows the case where step-up is performed by both control valves on the supply side and the evacuation side.
Figure 14:
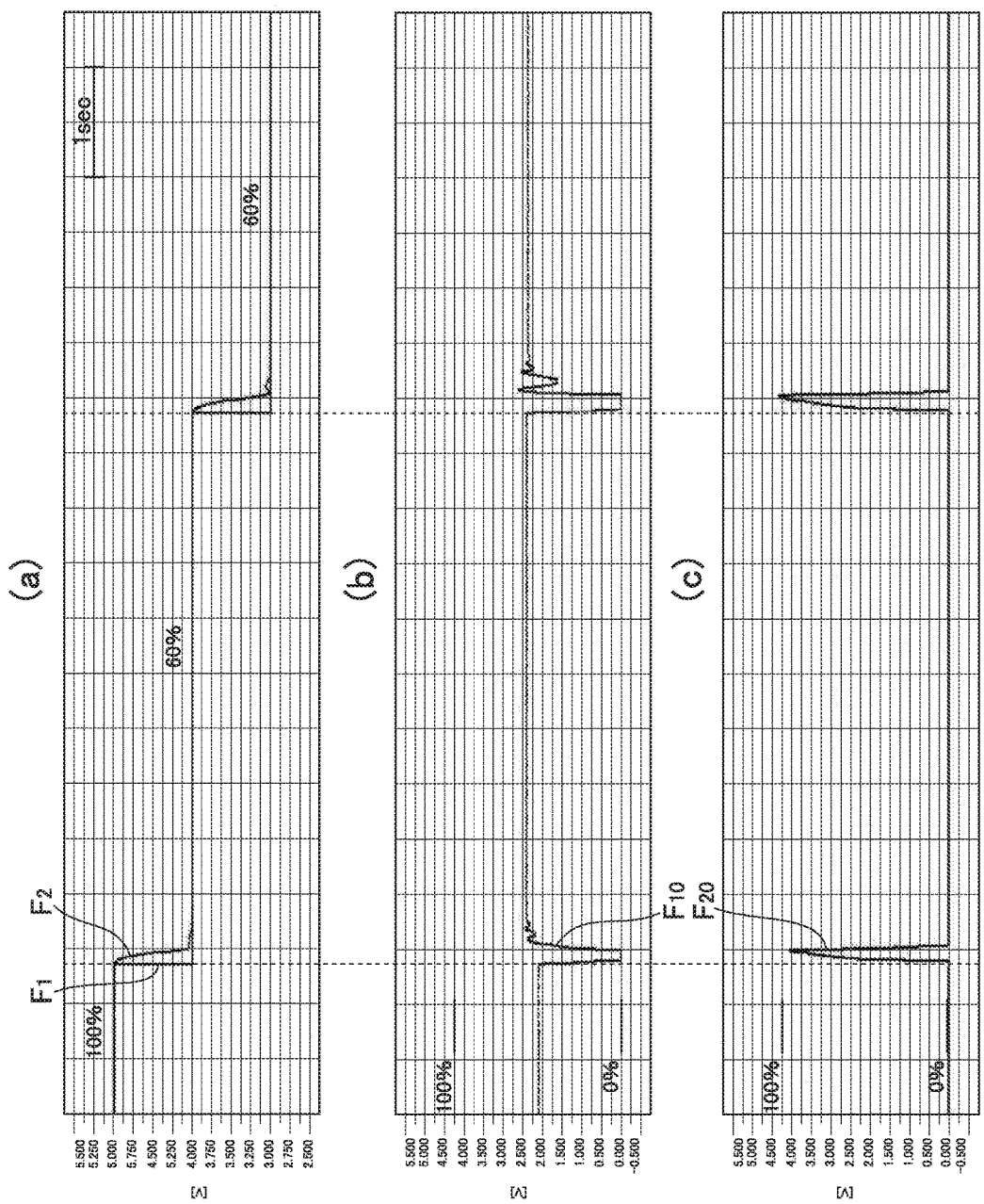
FIG. 14 Line graphs each showing changes in the input voltage to the piezoelectric elements (not illustrated) for the actuation of the respective control valves CVa and CVb at the time of measuring the step-down characteristics by the response characteristics testing device of FIG. 11: (a) shows the voltages of the control pressure input/output signals of the pressure controller $UPC_1$ at the time when the evacuation line is not operated, (b) shows the piezoelectric element actuation voltage of the control valve CVa of the pressure regulator $UPC_1$ at the time when the evacuation line is operated, and (c) shows the piezoelectric element actuation voltage of the control valve CVb of the pressure regulator $UPC_2$ at the time when the evacuation line is operated.

FIG. 3 shows the step-down response characteristics of the pressure-type flow controller 1 according to this embodiment at the time of continuous steps, which were measured under the same conditions as in the case of FIG. 8.

As is clear from the comparison of Line A and Line B between FIG. 8 and FIG. 3, in the pressure-type flow controller 1 according to this embodiment, the step-down time can be shortened to 0.5 seconds or less.

In addition, by regulating the degree of valve opening of the control valve for exhaust control 7, the step-down time itself can be easily controlled, and also, even when pressure-type flow controllers are operated in different flow ranges, step-down in such several pressure-type flow controllers can be synchronously performed.

Figure 4:
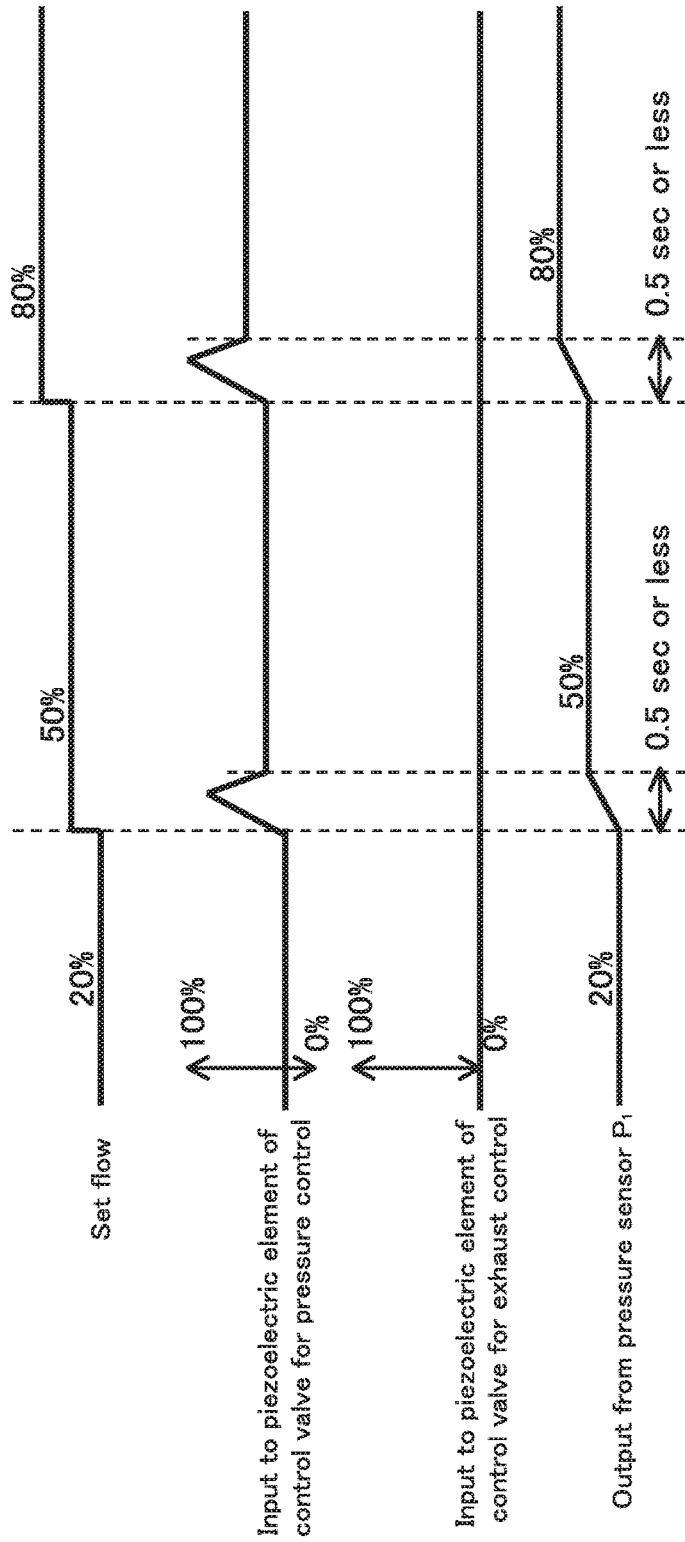
FIG. 4 A line graph showing changes in the input voltages to the piezoelectric-driven elements of the control valve for pressure control 6 and the control valve for exhaust control 7, as well as the output (pressure) from the pressure sensor $P_1$, in the case of increasing the set flow.

Incidentally, FIG. 4 shows changes in the input voltages to the piezoelectric-driven elements of the control valve for pressure control 6 and the control valve for exhaust control 7, as well as the output (pressure) from the pressure sensor $P_1$, in the case of increasing the set flow. In each case, the step-up time is 0.5 seconds or less, showing that increases in the flow from 20% to 50% and from 50% to 80% can be completed within a step-up time of 0.5 seconds or less.

Figure 5:
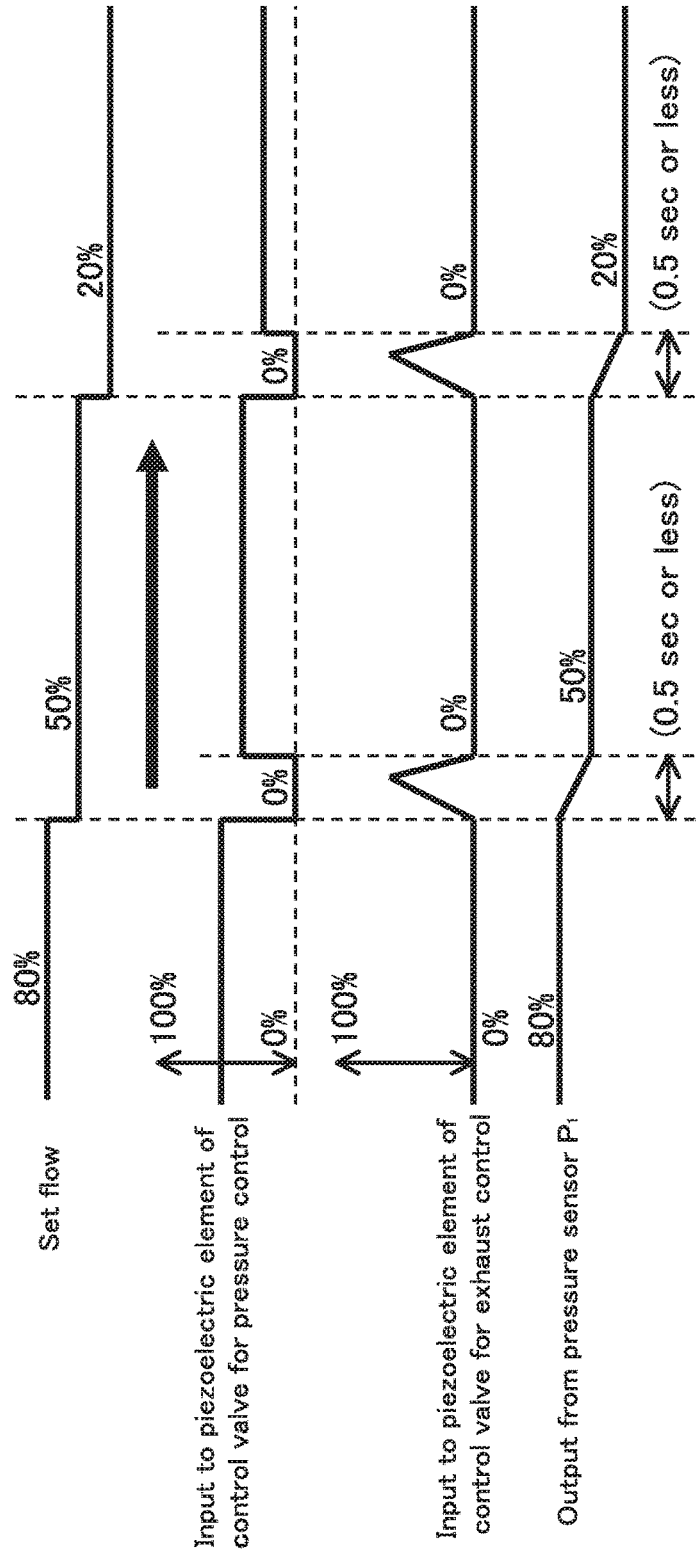
FIG. 5 A line graph showing changes in the input voltages to the piezoelectric-driven elements of the control valve for pressure control 6 and the control valve for exhaust control 7, as well as the output (pressure) from the pressure sensor $P_1$, in the case of reducing the set flow.
Figure 6:
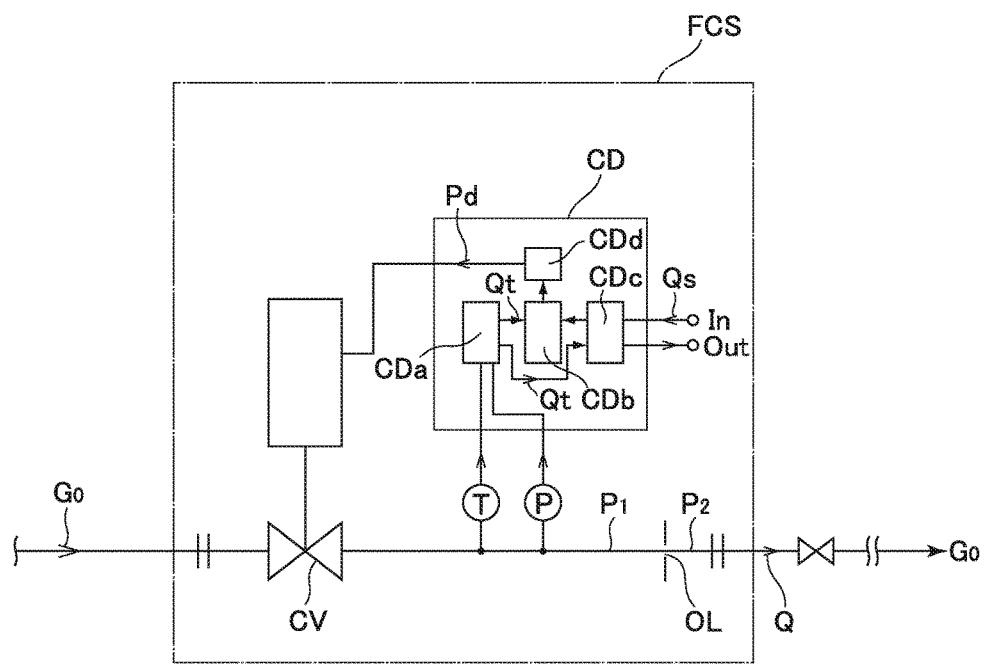
FIG. 6 A basic configuration diagram of a conventional pressure-type flow controller (FCS-N type).

In addition, inversely to FIG. 4, FIG. 5 shows changes in the input voltages to the piezoelectric-driven elements of the control valve for pressure control 6 and the control valve for exhaust control 7, as well as the output (pressure) from the pressure sensor $P_1$, in the case of reducing (stepping down) the flow from 80% to 50% and from 50% to 20%. In each case, the step-down time is 0.5 seconds or less.

Figure 7:
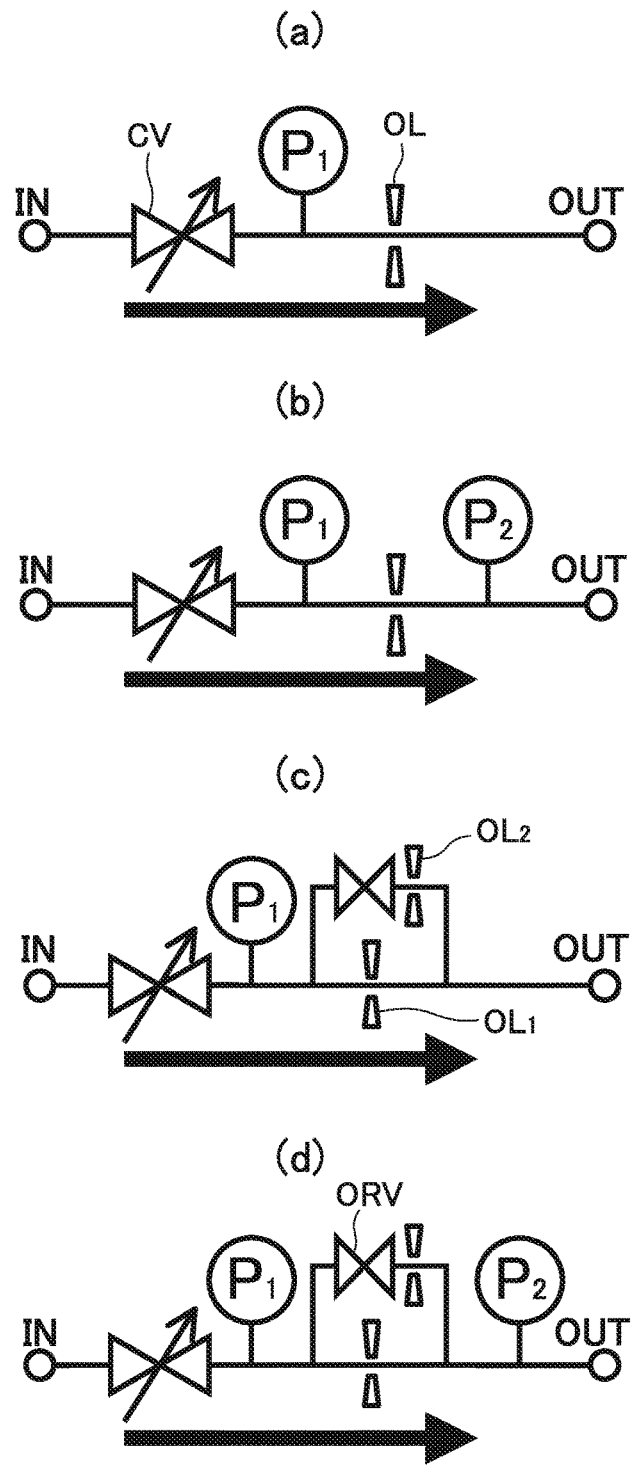
FIG. 7 Schematic configuration diagrams of conventional pressure-type flow controllers of various forms: (a) shows FCS-N type, (b) shows a pressure-type flow controller (FCS-WR type), (c) shows FCS-SN type, and (d) shows FCS-SWR type.

Incidentally, the embodiment of FIG. 1 has been described based on the pressure-type flow controller of FCS-N type of FIG. 7(*b*). However, needless to say, the pressure-type flow controller may be any of FCS-N type, FCS-S type, and FCS-SWR type, and the conventional pressure-type flow controller of any type shown in FIG. 7 can be used for the implementation of the present invention.

In addition, the operation principles and configurations of pressure-type flow controllers are already known, and thus the detailed description thereof is omitted herein.

That is, in the pressure-type flow controller 1 according to the present invention, by providing of the evacuation line 27 comprising the control valve for exhaust control 7, the step-down time in flow control can be significantly shortened, and also the step-down time can be easily regulated, leading to the improvement of the so-called gas replaceability of the pressure-type flow controller.

In addition, it also becomes possible to arbitrarily select the width dimension of the main body 2 of the pressure-type flow controller 1. For example, the dimension can be adjusted to the width dimension of a conventional pressure-type flow controller, that is, 92 mm. As a result, the pressure-type flow controller can be used for the repair of conventional facilities.

Further, By making evacuation line blind, such a controller can also be applied as an ordinary pressure-type flow controller. However, there are some problems remaining. For example, an evacuation line 27 is required, the amount of live gas exhausted is increased as a result of forced exhaust, application to an existing gas supply box is difficult, etc.

INDUSTRIAL APPLICABILITY

The present invention can be applied to flow controllers not only for gas supply facilities or gas supply devices for semiconductor manufacturing devices, but also for any gas supply facilities in the chemical industry, the food industry, and the like.

REFERENCE SIGNS LIST

1: Pressure-type flow controller
2: Main body
2*a*: Valve seat
3: Inlet-side block
4: Main body block
5: Outlet-side block
6: Control valve for pressure control
6*a*: Piezoelectric-driven element
7: Control valve for exhaust control
7*a*: Piezoelectric-driven element
9: Fluid inlet
10*a*: Fluid channel
10*b*: Exhaust channel
10*c*: Channel for leak detection
11: Fluid outlet
12: Exhaust outlet
13: Gasket
14: Panel control board
15: Casing
16: Connector for connection
17: Cylindrical body
18: Elastic body
19: Valve body presser foot
20: Valve body
21: Gas supply port
22: Supply-side switching valve
23: Outlet-side on/off valve
24: Outlet-side on/off valve
26: Mixed gas supply line
27: Evacuation line
28: Vacuum pump
29: Process chamber
$P_1$: Pressure sensor
$P_2$: Pressure sensor
OL: Orifice
G1 to G3: Live gas

The invention claimed is:
1. A pressure-type flow controller, comprising:
a main body provided with a gas channel communicating between a gas inlet and a gas outlet and an exhaust channel branched from the gas channel and communicating between the gas channel and an exhaust outlet;
a control valve for pressure control provided to the gas channel on an upstream side of a point of branching of the exhaust channel;
an orifice provided in the gas channel on a downstream side of the point of branching of the exhaust channel, the orifice having a fixed diameter smaller than a diameter of the gas channel at an upstream side of the orifice and at a downstream side of the orifice and being configured such that a flow rate of a gas passing through the orifice is proportional to a pressure on an upstream side of the orifice when a critical expansion condition is satisfied;

a pressure sensor for detecting an internal pressure of the gas channel between the control valve for pressure control and the orifice;

a control valve for exhaust control for opening/closing the exhaust channel; and a controller configured to control the control valve for pressure control and the control valve for exhaust control to control the flow rate of the gas flowing downstream of the orifice based on a set flow rate, wherein the controller controls the control valve for pressure control and the control valve for the exhaust control such that the gas between the control valve for pressure control and the orifice is exhausted when the set flow rate is reduced when an opening degree of the control valve for pressure control changes to a smaller opening degree.

2. The pressure-type flow controller according to claim 1, wherein the orifice is provided without a movable body capable of selectively closing a fluid passage of the orifice.

3. The pressure-type flow controller according to claim 1, further comprising a pressure sensor for detecting an internal pressure of the gas channel on the downstream side of the orifice.

4. The pressure-type flow controller according to claim 1, further comprising an another orifice connected in parallel with the orifice and an orifice switching valve for controlling a flow of a gas to the another orifice.

5. The pressure-type flow controller according to claim 4, further comprising a pressure sensor for detecting an internal pressure of the gas channel on the downstream side of the orifice.

6. The pressure-type flow controller according to claim 1, wherein the control valve for pressure control and the control valve for exhaust control are each a piezoelectric-driven metal-diaphragm control valve.

7. The pressure-type flow controller according to claim 6, configured such that a step-down response time to step down a flow rate of a gas flowing through the gas channel is controlled by adjusting an input voltage to a piezoelectric-driven element of the control valve for exhaust control.

8. The pressure-type flow controller according to claim 1, wherein the control valve for exhaust control is a pneumatically actuated valve or an electromagnetically actuated valve.

9. The pressure-type flow controller according to claim 1, configured such that gas in the exhaust channel is forcibly exhausted by a vacuum pump connected to the exhaust outlet.

10. The pressure-type flow controller according to claim 1, wherein gas between the control valve for pressure control and the orifice is exhausted by opening the control valve for exhaust control while temporary closing the control valve for pressure control.

11. The pressure-type flow controller according to claim 1, wherein the orifice is maintained in an open state with pressure on the upstream side of the orifice being controlled to be different from pressure on the downstream side of the orifice.

12. The pressure-type flow controller according to claim 1, wherein no valve is provided between the control valve for pressure control and the orifice along the gas channel.

13. The pressure-type flow controller according to claim 1,
wherein the control valve for pressure control and the control valve for exhaust control are proportional control valves.

* * * * *